United States Patent
Durfield et al.

(10) Patent No.: US 8,011,137 B2
(45) Date of Patent: Sep. 6, 2011

(54) GASKET AND INSULATING GLASS COMPRISING SAID GASKET

(75) Inventors: Mark Durfield, Rutledge, GA (US); Luc-Michel Riblier, Decatur, GA (US)

(73) Assignee: Saint-Gobain Glass France, Courbevoie (FR)

( * ) Notice: Subject to any disclaimer, the term of this patent is extended or adjusted under 35 U.S.C. 154(b) by 1248 days.

(21) Appl. No.: 10/526,553

(22) PCT Filed: Oct. 1, 2003

(86) PCT No.: PCT/FR03/02870
§ 371 (c)(1),
(2), (4) Date: Mar. 4, 2005

(87) PCT Pub. No.: WO2004/033940
PCT Pub. Date: Apr. 22, 2004

(65) Prior Publication Data
US 2006/0006612 A1    Jan. 12, 2006

(30) Foreign Application Priority Data

Oct. 9, 2002   (FR) ..................................... 02 12521
Mar. 26, 2003  (FR) ..................................... 03 03684

(51) Int. Cl.
*E06B 7/16* (2006.01)
(52) U.S. Cl. ........... 49/489.1; 49/368; 49/482.1; 49/501
(58) Field of Classification Search ............ 49/226, 49/227, 348, 349, 352, 501, 368, 369, 482.1, 49/489.1, 475.1
See application file for complete search history.

(56) References Cited

U.S. PATENT DOCUMENTS

| | | | | | |
|---|---|---|---|---|---|
| 1,444,885 | A | * | 2/1923 | Potter | 296/93 |
| 1,524,710 | A | * | 2/1925 | Hill | 296/93 |
| 2,172,091 | A | * | 9/1939 | Scott | 49/489.1 |
| 2,676,055 | A | * | 4/1954 | Humpal | 49/391 |
| 2,718,677 | A | * | 9/1955 | Cornell | 49/469 |
| 2,782,887 | A | * | 2/1957 | Zimmermann | 49/489.1 |
| 2,872,713 | A | * | 2/1959 | Haas | 52/172 |
| 3,289,352 | A | * | 12/1966 | Heilweil et al. | 49/478.1 |
| 3,729,869 | A | * | 5/1973 | Wenig | 49/489.1 |
| 3,732,646 | A | * | 5/1973 | Horvay et al. | 49/492.1 |
| 4,084,347 | A | * | 4/1978 | Brown | 49/397 |
| 4,205,104 | A | * | 5/1980 | Chenel | 428/34 |
| 4,226,063 | A | * | 10/1980 | Chenel | 52/172 |
| 4,233,780 | A | * | 11/1980 | Royce et al. | 49/475.1 |

(Continued)

FOREIGN PATENT DOCUMENTS

CH     399 925    9/1965

(Continued)

*Primary Examiner* — Jerry Redman
(74) *Attorney, Agent, or Firm* — Oblon, Spivak, McClelland, Maier & Neustadt, L.L.P.

(57) ABSTRACT

A seal including a body with a longitudinal axis X that includes a base-piece having a first end and an opposed second end, two opposed side walls connecting the two ends, and two shoulders located on either side of each of the two side walls and at one of the ends. The body is made of a single flexible material and, in a section perpendicular to the X axis, the width of the base-piece, from one side wall to the other, in the vicinity of the end on the opposite side from the shoulders is larger than the width of the base-piece, from one side wall to the other, in the vicinity of the end near the shoulders.

11 Claims, 4 Drawing Sheets

U.S. PATENT DOCUMENTS

| | | | | |
|---|---|---|---|---|
| 4,807,419 A | * | 2/1989 | Hodek et al. | 52/786.1 |
| 4,822,649 A | * | 4/1989 | Canaud et al. | 428/34 |
| 4,828,274 A | * | 5/1989 | Stannard | 277/641 |
| 4,950,715 A | * | 8/1990 | Duck et al. | 525/127 |
| 4,994,309 A | * | 2/1991 | Reichert et al. | 428/34 |
| 5,095,657 A | * | 3/1992 | Marsh | 49/492.1 |
| 5,113,628 A | * | 5/1992 | Richardson et al. | 52/171.3 |
| 5,129,184 A | * | 7/1992 | Fish | 49/478.1 |
| 5,533,311 A | * | 7/1996 | Tirrell et al. | 52/309.9 |
| RE35,392 E | * | 12/1996 | Richardson et al. | 52/172 |
| 5,584,143 A | | 12/1996 | Kennedy | |
| 5,592,782 A | * | 1/1997 | Scott | 49/489.1 |
| 5,622,414 A | | 4/1997 | Artwohl et al. | |
| 6,668,499 B2 | * | 12/2003 | Degelsegger | 52/204.62 |
| 6,854,786 B2 | * | 2/2005 | Berglund et al. | 296/146.9 |

FOREIGN PATENT DOCUMENTS

| | | | |
|---|---|---|---|
| DE | 196 28 034 | 1/1998 | |
| EP | 0069021 A1 * | 6/1982 | 49/501 |
| FR | 2 594 479 | 8/1987 | |
| GB | 1 554 941 | 10/1979 | |
| GB | 2092652 A * | 8/1982 | |

* cited by examiner

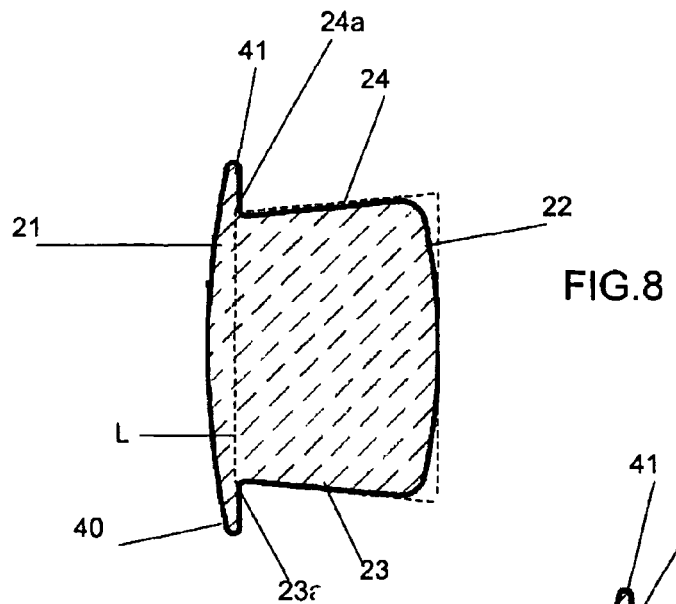
FIG. 8
FIG. 9
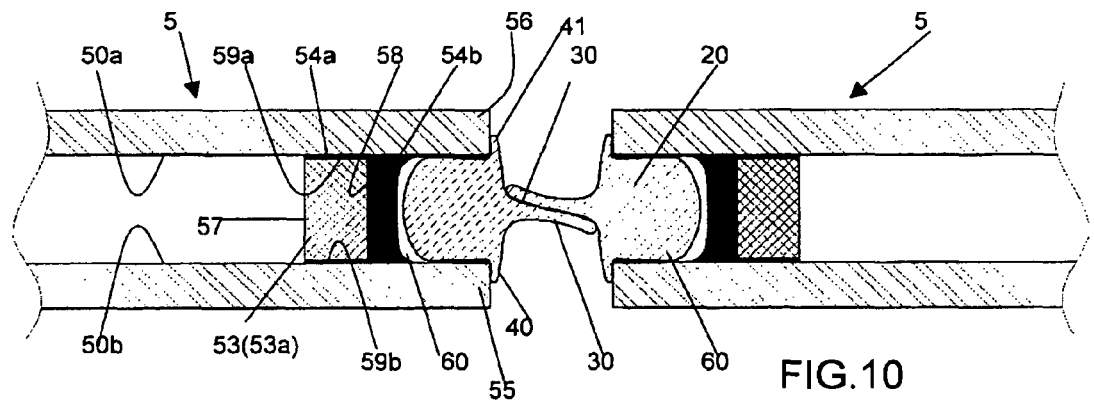
FIG. 10

GASKET AND INSULATING GLASS COMPRISING SAID GASKET

BACKGROUND OF THE INVENTION

I. Field of the Invention

The invention relates to a seal that may in particular be fitted into an insulating glazing panel. This seal is particularly suitable for insulating glazing panels that are intended to be used in refrigerated cabinets, but the use of this seal is in no way restrictive and may be applied to any glazing panel having a housing intended to receive the seal of the invention.

II. Description of Related Art

Refrigerated cabinets are, for example, refrigerated display cases or chests whose insulating glazing panels constitute the glass fronts behind which products to be consumed are displayed. These products or foodstuffs, that have to be visible to the consumer, are perishable and therefore have to be kept at a suitable temperature, while preventing any bacteriological contamination.

The insulating glazing panels of these refrigerated cabinets are often joined end to end and the end glazing panels are generally attached to a side wall. However, a sufficient space must be provided between two glazing panels and/or a glazing panel and a side wall so as to allow a display case to be opened and closed in order to place or remove the products, or else to clean the display case, without any risk of striking the adjacent glazing panel or the side wall. Of course, it is paramount to provide a seal in this space so as to ensure thermal insulation between the refrigerated interior of the display case and the outside, to reduce thermal losses and to prevent any bacteriological contamination from outside the display cases of the products placed inside them.

Sealing is then achieved by seals fastened to the periphery of the glazing panels, each seal having a sealing lip that covers the lip of the seal of the adjacent glazing panel when the display cases are in the closed position, or else bears against the side wall. The seals are regularly put under stress as the display cases are being frequently opened and closed, and it is also preferable for them to be resistant to these rubbing forces by suitably fastening them to the glazing panel, while still being able to be easily removed for the purpose of replacing them.

Document U.S. Pat. No. 5,622,414 proposes a seal for these types of refrigerated cabinet.

The front of a refrigerated cabinet is formed from one or more insulating glazing panels, that are generally curved, comprising at least two glass panes separated from each other by an air or gas layer and held spaced apart by a spacer, together with sealing means designed to seal against water vapor and against water and/or other liquids between the inside and the outside of the glazing panel.

In that document, the spacer used on the lateral parts of the double-glazing panel consists of a hollow rigid strip that is open to the outside of the glazing panel and has a bottom facing the gas or air layer, side walls facing the internal faces of the glass panes and an opening on the opposite side from the bottom, giving access to the internal cavity of the strip at the edges of the glass panes. The free ends of the side walls toward the opening terminate in the form of a narrowed portion such as a constriction.

The sealing means of the insulating glazing panel consist of a first barrier impermeable to water vapor, such as a butyl seal placed between the side walls of the spacer and the internal faces of the glass panes, and a second barrier, impermeable to water and/or to other liquids, such as a polysulfide placed between the narrowed portion of the spacer and the internal faces of the glass panes.

The seal associated with this glazing panel includes a first portion that is held inserted in the cavity provided in the body of the spacer, and another portion placed on the outside of the cavity of the strip and projecting from insulating the glazing panel in order to cooperate with a seal for an adjacent insulating glazing panel.

More precisely, the seal of that document, which is obtained by extrusion, comprises a stem, a flat part extending the stem, a central rib located between the stem and the flat part, and flanges going from the stem obliquely toward the central rib. The stem and the central rib are made of a rigid plastic having a Shore A hardness of about 75 to 80 so as to ensure that they are inserted into the cavity of the spacer, in particular at the restriction, and to ensure that the seal is correctly positioned. The flanges and the flat part are made of a flexible plastic having a Shore A hardness of about 65 so as to ensure that they bend when the stem is forcibly inserted into the cavity, in particular at the restriction, and so as to ensure suitable flexibility for the flat part that is intended to cooperate with a flat part of a seal of an adjacent insulating glazing panel.

However, this seal does not seem to provide a completely satisfactory solution. This is because such a seal is necessarily associated with the spacer of the insulating glazing panel of the display case, this spacer having to have a specific shape, thereby requiring special spacers to be manufactured for these insulating glazing panels and resulting in additional production costs.

Moreover, if the central rib does not correctly close off the opening of the spacer, there is a possible risk of bacteriological contamination and proliferation in the cavity of the spacer, something which is inconceivable for this type of insulating glazing panel used in refrigerated cabinets intended for merchandizing food products.

Furthermore, the seal is made of at least two separate plastics—one rigid and the other more flexible—resulting in more complex manufacturing means than if the seal were to be obtained from a single material, and therefore not contributing to achieve as low as possible a manufacturing cost.

Finally, the sealing means of the insulating glazing panel, which in particular are made of polysulfide, are visible along the edge of the glazing panel, providing it with an unattractive appearance that may make customers feel that the display case is not clean.

BRIEF SUMMARY OF THE INVENTION

The object of the invention is therefore to provide a seal, especially one intended to be associated with an insulating glazing panel particularly in refrigerated cabinets, which does not have the drawbacks of the prior art.

According to the invention, the seal comprising a body of longitudinal axis X which comprises a base-piece having a first end and an opposed second end, two opposed side walls connecting the two ends, and two shoulders located on either side of each of the two side walls and at one of the ends, is characterized in that it is made of a single flexible material and that, in a section perpendicular to the X axis, the width of the base-piece, from one side wall to the other, in the vicinity of one of the ends, is larger than the width of the base-piece, from one side wall to the other, in the vicinity of the opposite end.

The term "flexible material", is understood to mean a material that can be manually compressed, in particular so as in this case to reduce the width of the base-piece so as to insert the seal into a space of narrower cross section than that of the base-piece when it is not compressed.

Advantageously, this flexible material has a Shore A hardness of between 40 and 60. This material is a plastic of the silicone, butyl, EPDM, Hypalon, natural rubber, Neoprene, nitrile, polybutadiene, polyisoprene, polyurethane, SBR or Viton type.

According to one feature, the actual cross section of the base-piece, in the section perpendicular to the X axis and bounded by the end on the opposite side from the shoulders, the side walls and a finite line L parallel to the ends and connecting the ends of the side walls at the shoulders, lies within a reference cross section of trapezoidal shape, the large base of which merges with the end on the opposite side from the shoulders and the small base of which merges with the line L.

According to one embodiment, said cross section of the base-piece is of trapezoidal shape.

According to another embodiment, said cross section of the base-piece is of approximately square or rectangular shape, the ends of the side walls at the shoulders having a recess toward the inside of the seal.

According to yet another embodiment, the two side walls of the base-piece include mutually parallel lateral projections that are inclined toward the shoulders and placed toward the end on the opposite side from the shoulders.

According to another feature, the base-piece is solid. As a variant, it may include an internal cavity.

According to another feature, the seal includes a sealing lip extending from the end of the base-piece lying on the same side as the shoulders. This lip may be solid and have a cross section of oblong and approximately flat shape, or it may be tubular.

Preferably, the shoulders have, at their free ends, a smaller thickness than the portions that start from the ends of the side walls.

Advantageously, the seal of the invention may be associated with a glazing panel having a housing that receives the base-piece of the seal by compressing it.

According to one feature, the body of the base-piece has, at least at its end on the opposite side from the shoulders, a substantially larger width than the width of the housing.

This type of glazing panel is, for example, an insulating glazing panel that may, for example, be used in a refrigerated cabinet. The insulating glazing panel comprises at least two glass panes spaced apart by a gas or air layer, a spacer keeping the glass panes apart and being placed set back from the edges of the glass panes so as to leave a groove forming the housing, the bottom of which constitutes one face of the spacer, the base-piece of the seal being housed in the groove and held therein by compression, and the shoulders butting against the edges of the glass panes.

Preferably, means for sealing the inside of the glazing panel cover the bottom of the groove and possibly one part of the side walls of the groove that are formed by the internal faces of the glass panes, the body of the base-piece of the seal cooperating frictionally with the sealing means.

The glazing panel may be flat or curved.

BRIEF DESCRIPTION OF THE DRAWINGS

Other advantages and features of the invention will become apparent in the rest of the description, in conjunction with the appended drawings in which:

FIGS. 4 to 9 are sectional views according to separate embodiments of the seal of the invention; and FIG. 10 is a partial sectional view of two adjacent insulating glazing panels incorporating seals of the invention.

DETAILED DESCRIPTION OF THE INVENTION

Figure 1:
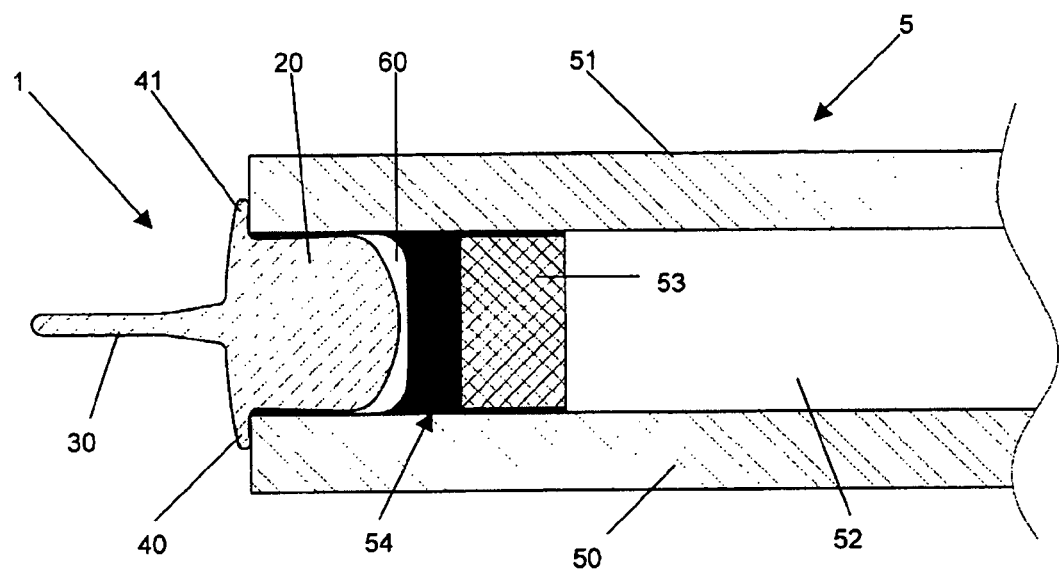
FIG. 1 illustrates a partial sectional view of an insulating glazing panel into which the seal of the invention is fitted.
Figure 2:
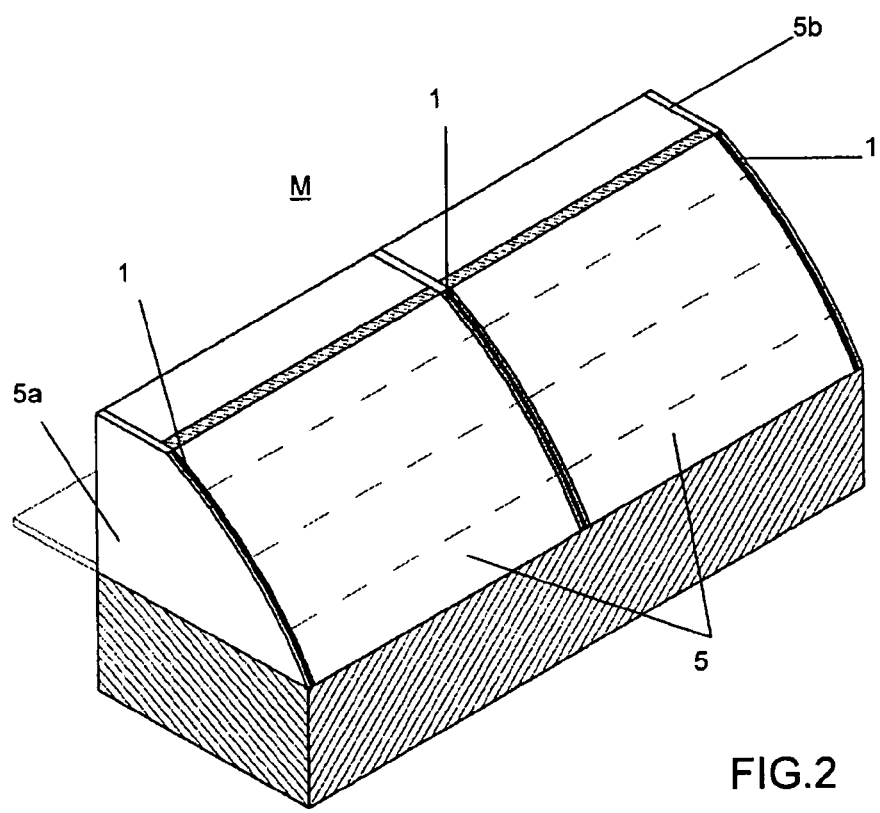
FIG. 2 illustrates a side view of a refrigerated cabinet incorporating two insulating glazing panels into which seals of the invention are fitted.

In FIG. 1, the seal 1 of the invention is, by way of example, associated with an insulating glazing panel 5 that is intended to be incorporated into a refrigerated cabinet M as shown in FIG. 2.

As FIG. 2 illustrates, the sealing between two insulating glazing panels 5 that butt against each other is achieved by means of two seals 1 according to the invention, associated with the two respective insulating glazing panels; likewise, the sealing between each of the insulating glazing panels 5 and each side wall, 5a and 5b respectively, of the cabinet is achieved by a seal 1 of the invention.

The insulating glazing panel illustrated partly in cross section in FIG. 1 comprises two glass panes 50 and 51 separated by an air or gas layer 52, a spacer or spacer frame 53 that serves to keep the two glass panes apart, and sealing means 54 that seal the inside of the glass panes from the outside.

Figure 3:
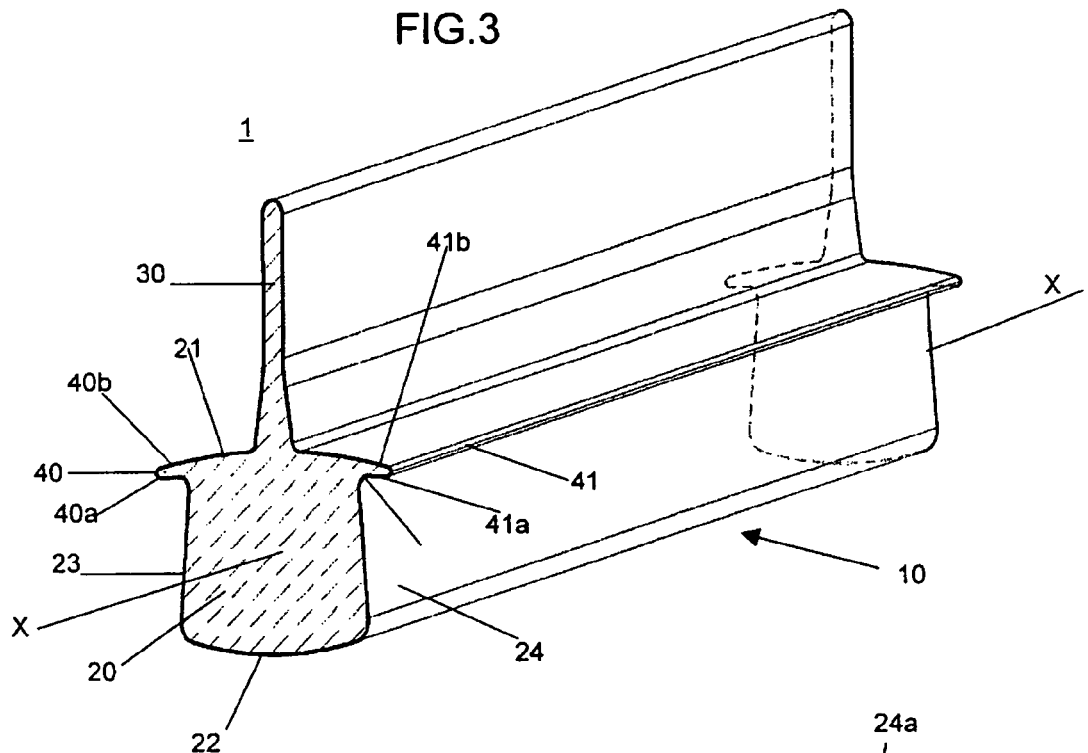
FIG. 3 is a side view of the seal of the invention according to a preferred embodiment.

FIG. 3 shows that the seal 1 comprises a longitudinal body 10 of axis X, having a base-piece 20, two shoulders 40 and 41 and optionally, depending on the application of the seal, a sealing lip 30.

The body 10 is obtained by extrusion and is made of a single flexible material, more particularly a plastic, such as a silicon for example, having a Shore A hardness of between 40 and 60, and preferably 50. We will return to the properties of the plastic later.

The base-piece 20 of the body is designed to be inserted into a housing 60 in an insulating glazing panel (FIG. 1), the shape and dimensions of the base-piece being suitable for keeping the seal in place in the housing without the need to use additional fastening means, such as adhesive bonding means, and without requiring cooperation with the spacer of the insulating glazing panel.

The base-piece 20 is preferably solid (FIGS. 3 to 8) in order to avoid any risk of bacteriological contamination inside the seal. However, to save on material, and therefore on manufacturing cost, and/or depending on the application of the seal, in particular if at least one of its free ends of the seal has to cooperate with a projecting element, it is possible to produce a base-piece with an internal cavity 20a of defined shape (FIG. 9) which may thus either cooperate with a projecting element of a shape complementary to that of the housing, or be plugged at both ends of the seal, once the latter has been provided with the desired dimensions for it to be inserted into the glazing panel.

The base-piece with a first end 21 and an opposed second end 22, two opposed side walls 23, 24 that join the two ends together and have the same length or approximately equivalent length so as to ensure that the seal is stable when it is fitted into the insulating glazing panel, and two shoulders 40, 41 that are located on either side of the side walls and at the ends 23a, 24a of the side walls joined to the end 22. According to the invention, in cross section perpendicular to the X axis, the width of the base-piece in the vicinity of the end 22 on the opposite side from the shoulders is larger than the width of the base-piece in the vicinity of the opposed end 21.

In particular, the section of the base-piece, which is given in the cross section perpendicular to the X axis and is bounded by the end 22 on the opposite side from the shoulders, by the side walls 23, 24 and by a finite line L parallel to the ends 21, 22 and joining the ends 23a, 24a of the side walls, lies within a section of trapezoidal shape (illustrated by the dotted lines in FIGS. 4 to 9), the large base of which merges with the end 22 on the opposite side from the shoulders and the small base of which merges with the line L.

The sealing lip 30 of the seal is present when the seal has to seal between two insulating glazing panels butted against each other and/or between an insulating glazing panel and a side wall. However, said sealing lip may be omitted when simple or complementary sealing of the insulating glazing panel is to be provided without rubbing against an adjacent element. FIG. 8 illustrates an embodiment example of the seal without a sealing lip.

According to a first and preferred embodiment of the invention, the actual section of the base-piece 20 in a cross section perpendicular to the X axis has an approximately trapezoidal shape (FIGS. 3, 4, 8 and 9), the end 22 of the base-piece constituting the large base of the trapezoid while the line L constitutes the small base, the end 22 being wider than the width of the housing in which the base-piece is designed to be inserted.

According to a second embodiment, the actual section of the base-piece is of approximately square or rectangular shape as far as the ends 23a, 24a of the side walls at the shoulders (FIG. 5), the opposed ends 21 and 22 being approximately perpendicular to the side walls 23, 24. The widths of the ends 21 and 22 are equivalent and substantially larger in dimension than the width of the housing. In this embodiment, the ends 23a, 24a terminate in a recess oriented toward the inside of the seal, so that the base-piece material intended to be compressed in the housing can be distributed within these recesses, which will result in the shoulders 40 and 41 undergoing no deformation.

According to a third embodiment, the actual section of the base-piece in a cross section perpendicular to the X axis is of approximately square or rectangular shape (FIGS. 6 and 7), the opposed ends 21 and 22 being approximately perpendicular to the side walls 23, 24. The width of the ends 21 and 22 is approximately the same as the width of the housing into which the base-piece is intended to be inserted. Furthermore, the base-piece has lateral projections 25 arranged along the side walls 23, 24, these projections, which are mutually parallel, being inclined toward the end 21 and the shoulders 40, 41, in the manner of a fir tree. The projections 25 are positioned toward the end 22 of the base-piece on the opposite side from the shoulders 40, 41. The distance separating the ends of the two projections 25 on the respective two walls 23 and 24 is larger than the width of the housing.

Figure 4:
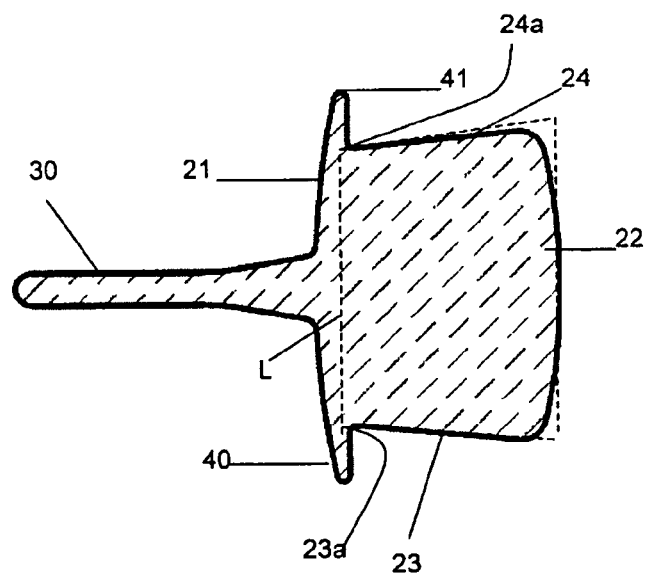
Figure 5:
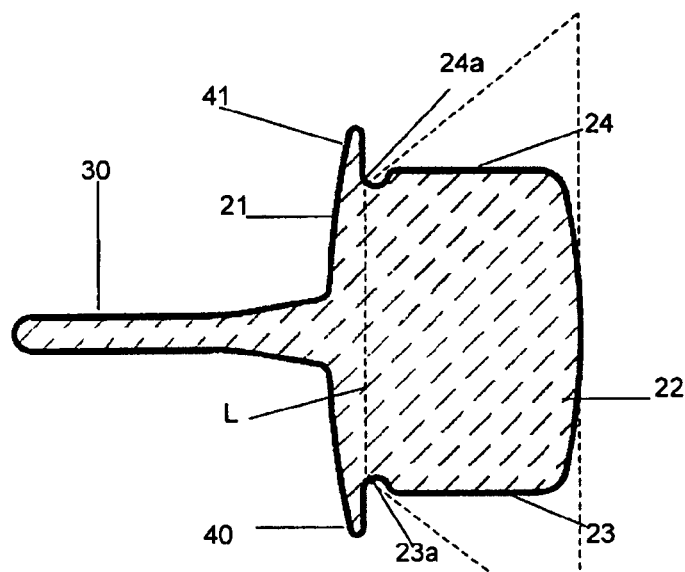
Figure 6:
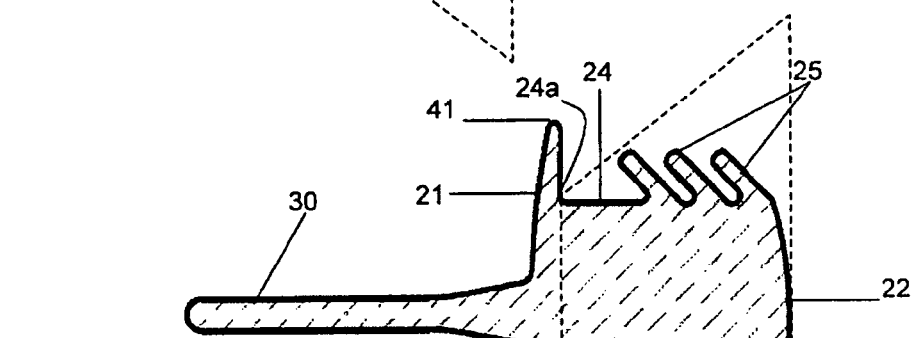
Figure 7:
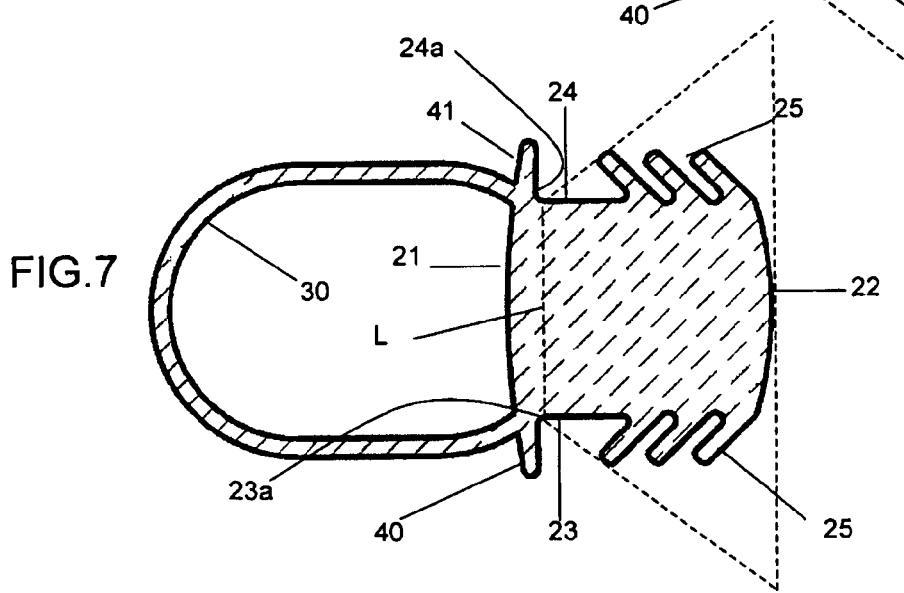

As regards the lip 30, this may be solid, flat and of oblong shape (FIGS. 4, 5 and 6). Preferably said slip starts from the middle of the end 21 of the base-piece.

As a variant, the lip may be tubular (FIG. 7) and have an oblong shape, as illustrated, or else a circular shape. It is integral with the end 21 of the base-piece at two separate points. Advantageously, the section of the lip is designed to be as flexible as possible.

The fitting of the seal of the invention into an insulating glazing panel will now be described with reference to FIG. 10, in which two glazing panels 5 are in abutment.

The spacer 53 of the insulating glazing panel is generally formed from a metal or composite strip that is hollow and filled with a molecular sieve 53a or desiccant, having in particular the role of absorbing the water molecules that are trapped in the air layer during manufacture of the glazing panel and that would be liable to condense during use of the glazing panel in a cold atmosphere, resulting in fogging.

The spacer 53 is placed around the periphery of the glazing panel and is set back relative to the edges 55, 56 of the glass panes so as to create a groove that constitutes the housing 60 into which the base-piece of the seal is intended to be inserted. The spacer has an internal face 57 facing the air layer, an external opposed face 58 that forms the bottom of the groove 60 and opposed side faces 59a, 59b placed against the internal faces 50a and 50b, respectively, of the glass panes.

The spacer is fastened to the glass panes, for example by adhesively bonding the side faces 59a, 59b to the faces 50a and 50b of the glass panes by means of a fastening material 54a such as a butyl. The butyl material 54a furthermore constitutes part of the sealing means 54 for sealing against water vapor.

In the case of curved glazing panels, it is generally more convenient to employ, as a variant, a composite spacer impregnated with desiccant. This is because such spacers have the feature of being very flexible and consequently well suited to being used on curved glass panes.

Such a spacer is, for example, sold under the name "Swiggle Strip" by Tremco and by Truseal. It is in the form of a pre-extruded butyl-based strip containing a molecular sieve into which is incorporated a metal core that acts as spacer and as water vapor barrier. The butyl provides the functions of adhesive bonding and of water vapor impermeability against the faces 50a and 50b of the glass panes.

Another example of a spacer is "Super Spacer" sold by Edgetech. This time it is flexible silicon foam impregnated with desiccant. The external face 58 of the spacer is made impermeable by a metallized film and the adhesive bonding and the sealing to the faces 50a and 50b of the glass panes is then achieved by an acrylic adhesive incorporated into the spacer.

The sealing means 54 include, in addition to the butyl 54a or the adhesive that provides the water vapor impermeability, a material 54b that provides impermeability to water and to other liquids. The material 54b is applied in the groove 60, at least against the external face 58 of the spacer and optionally against the internal faces 50a and 50b of the glass panes.

This material 54b is, for example, a polysulfide or a polyurethane or any other known material that is impermeable to liquids.

The seal 1 is fitted into the glazing panel so that the base-piece 20 is housed in the groove 60. The body of the base-piece 20 has on the same side as its end 22 intended to be received in the bottom of the groove 60 a substantially larger width than the width of the groove. According to the first and second embodiments of the base-piece, this is exactly the width of the end 22 corresponding to the large base of the trapezoid within which the actual section of the base-piece lies. According to the third embodiment of the base-piece, this is exactly the width corresponding to the distance separating the ends of the two projections 25 that are placed on the two side walls 23, 24 respectively. Thus, the resulting deformation on compressing the base-piece during its insertion makes it possible to minimize the deformation of the shoulders 40, 41 and of the sealing lip 30.

This larger width of the base-piece, compared to its housing, namely the groove, means that the base-piece must be able to be compressed, which is the case because of the content of its material. Inserting the base-piece, by compressing it, results, once it is in place, in a spring effect that increases the frictional forces between the seal and the internal faces of the glazing panel so as to keep the seal firmly in place despite subsequent stressing such as rubbing against other seals that would have a tendency to pull the base-piece toward the outside of the groove.

The internal faces 50a, 50b of the glass panes, which are rather smooth, may optionally be covered with the sealant 54b so as to further increase the resistance to rubbing against the material of the seal and thus maximize the compression spring effect.

Once the base-piece is in position, the shoulders 40, 41 are designed to butt against the edges 55 and 56 of the glazing panel so as to completely cover the groove 60 of the glazing panel into which the base-piece 20 is inserted, thereby perfectly sealing the groove and preventing any bacteriological contamination and proliferation therein.

Moreover, the shoulders 40, 41 cover the edges of the glass panes sufficiently to make the sealing means 54 invisible, giving a clean appearance to that side of the glazing panel into which the seal is fitted.

Furthermore, when this seal is used on curved glazing panels having relatively small radii of curvature, the shoulders are subjected to deformation stresses, one shoulder being in tension while the other is compressed. To minimize these stresses, the thickness of the free ends 40a, 41a of the shoulders is advantageously reduced compared to the thickness of the portions 40b, 41b from which the shoulders start at the end 21 of the base-piece (FIG. 3).

As regards the sealing lip 30, this projects from the edges of the glass panes so as to be applied against a side wall 5a or 5b (FIG. 2) or else to cooperate with another sealing lip 30, one of the lips covering the other as illustrated in FIG. 10.

Since all the elements of the body 10 of the seal are stressed when the seal is being fitted into the glazing panel and subsequently when a display case is being repeatedly opened and closed, the single material forming the body is chosen appropriately.

Indeed, this material must be sufficiently compressible so as to create the spring effect of the base-piece in the groove and keep the seal firmly in place during subsequent stressing. It must be of suitable flexibility for the shoulders and the sealing lip, which are elements outside the glazing panel, to follow the contours of the glazing panel, in particular at points of curvature of the glazing panel when this is curved, without it twisting if it is too flexible or splitting if it is too rigid. The flexibility also allows the sealing lip to cooperate easily with another adjacent lip in order to provide an overlap.

Finally, this material must age little over time so that the sealing lip can withstand being stressed many times over time.

Examples of materials exhibiting these properties are, by way of non-limiting examples: butyl, EPDM, Hypalon®, natural rubber, Neoprene®, nitrile, polybutadiene, polyisoprene, polyurethane, silicone, SBR and Viton®.

Preferably, a silicone with a Shore A hardness of 50 is chosen, which meets, on the one hand, the necessary compressibility and flexibility criteria and, on the other hand, the international standards as regards contact with food, and which furthermore maintains all its properties at the operating temperatures in refrigerated cabinets between −10° C. and 70° C., the silicone remaining inert between −70° C. and 300° C.

Of course, it is possible at any time to be able to remove the seal from the groove of the glazing panel, for example to change it. All that is required is to pull strongly on the sealing lip, the force needed to pull it out being greater than that exerted when the seal is stressed on opening the display case.

The invention claimed is:

1. A glazing panel, comprising:
a housing including at least two glass panes;
a spacer that spaces apart the two glass panes;
a sealing layer applied to an outer face of the spacer and extending between the spacer and the two glass panes; and
a seal made of a single flexible material comprising a body with a longitudinal axis that comprises a base-piece having a first end and an opposed second end, two opposed side walls connecting the two ends, and two shoulders located on either side of each of the two side walls and at one of the ends,
wherein, in a section perpendicular to the longitudinal axis, a width of the base-piece from one of the side walls to an other of the side walls, in a vicinity of the end on an opposite side from the shoulders, is larger than a width of the base-piece, from the one of the side walls to the other of the side walls, in a vicinity of the end near the shoulders,
wherein the width of the base-piece in the vicinity of the end on the opposite side from the shoulders is larger than a width of the housing from the one of the glass panes to the other of the glass panes so that, when the seal is positioned in the housing, the two sides walls contact the two glass panes such that the width of the base-piece in the vicinity of the end on the opposite side from the shoulders is compressed to the width of the housing, and
wherein the seal is separated from the spacer and the sealing layer by a space such that the seal does not contact the spacer and the seal does not contact the sealing layer.

2. The glazing panel as claimed in claim 1, wherein the glazing panel is insulating and comprises the at least two glass panes spaced apart by a gas or air layer, the spacer keeping the glass panes apart and being placed set back from edges of the glass panes so as to leave a groove forming the housing, a bottom of which constitutes one face of the spacer, the base-piece of the seal being housed in the groove and held therein by compression, and the shoulders butting against the edges of the glass panes.

3. The glazing panel as claimed in claim 2, wherein the sealing layer covers a bottom of the groove and one part of side walls of the groove that are formed by internal faces of the glass panes.

4. The glazing panel as claimed in claim 3, wherein the sealing layer includes a butyl layer positioned between the spacer and the at least two glass panes.

5. The glazing panel as claimed in claim 3, wherein the sealing layer includes a polysulfide layer positioned between the spacer and the seal.

6. The glazing panel as claimed in claim 3, wherein the sealing layer includes a polyethane layer positioned between the spacer and the seal.

7. The glazing panel as claimed in claim 1, wherein the glazing panel is flat or curved.

8. A refrigerated cabinet comprising at least one glazing panel as claimed in claim 7.

9. The refrigerated cabinet as claimed in claim 8, wherein the single flexible material of the seal has a Shore A hardness of between 40 and 60.

10. The glazing panel as claimed in claim 1, wherein the single flexible material of the seal has a Shore A hardness of between 40 and 60.

11. The glazing panel as claimed in claim 1, wherein when the seal is positioned in the housing, the two sides walls contact the two glass panes in the vicinity of the end near the shoulders.

* * * * *